UNITED STATES PATENT OFFICE.

HENRY POOL, OF WESTMINSTER, MARYLAND.

INSECTICIDE COMPOUND.

SPECIFICATION forming part of Letters Patent No. 295,426, dated March 18, 1884.

Application filed August 3, 1883. (No specimens.)

*To all whom it may concern:*

Be it known that I, HENRY POOL, of Westminster, in Carroll county, Maryland, have invented a new and useful composition of matter of the class known as Insecticides, of which the following is a specification.

My composition consists of the following ingredients, combined in the proportions stated, viz: lime, (air-slaked,) four quarts; plaster-of-paris, four quarts; sulphate of ammonia, one pound; sugar, (pulverized,) two pounds; oil of worm-seed, one ounce; oil of sassafras, one ounce. These ingredients, except the oil of worm-seed, are to be mixed together in any suitable manner, and then the oil of worm-seed is to be poured into the mixture and the whole sifted through a sieve. The powder is then to be dried, and used as other powder insecticides.

I am aware that lime, plaster-of-paris, and ammonia have been used in insecticides heretofore; but the combination with these of the oil of worm-seed is believed to add very materially to the effectiveness of the composition.

What I claim is—

The herein-described composition of matter to be used as an insecticide, consisting of slaked lime, plaster-of-paris, ammonia, sugar, oil of worm-seed, and oil of sassafras, in the proportions specified.

HENRY POOL.

Witnesses:
WM. A. McKELLIP,
JNO. C. FRIZELL.